M. W. FRANKLIN.
METHOD AND APPARATUS FOR PRODUCING A GASEOUS REACTION BY A SILENT DISCHARGE.
APPLICATION FILED OCT. 21, 1911.
1,064,064.
Patented June 10, 1913.
3 SHEETS—SHEET 1.
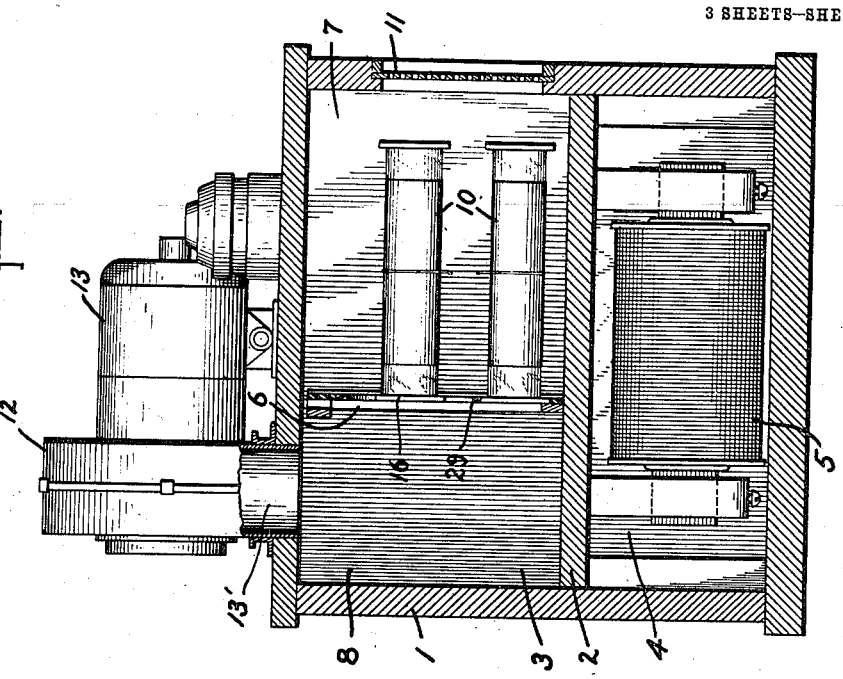
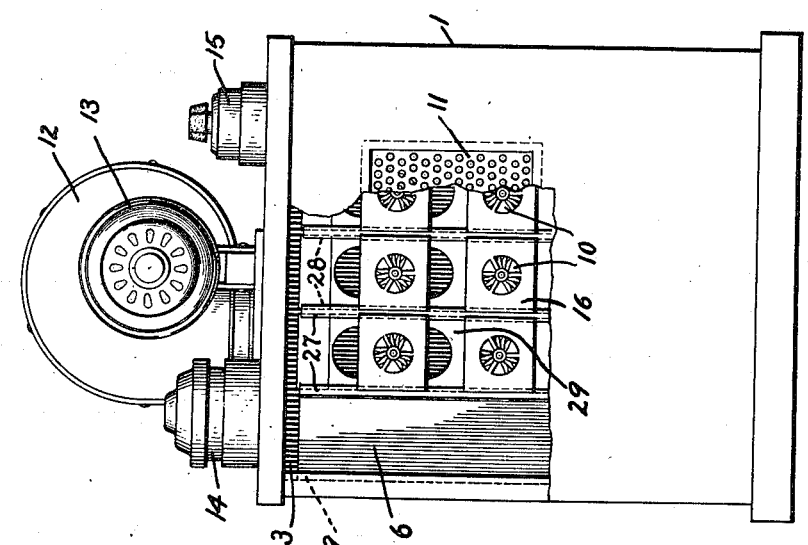
WITNESSES:
Earl G. Klock.
J. Ellis Glen
INVENTOR:
MILTON W. FRANKLIN,
by Albert G. Davis
HIS ATTORNEY.

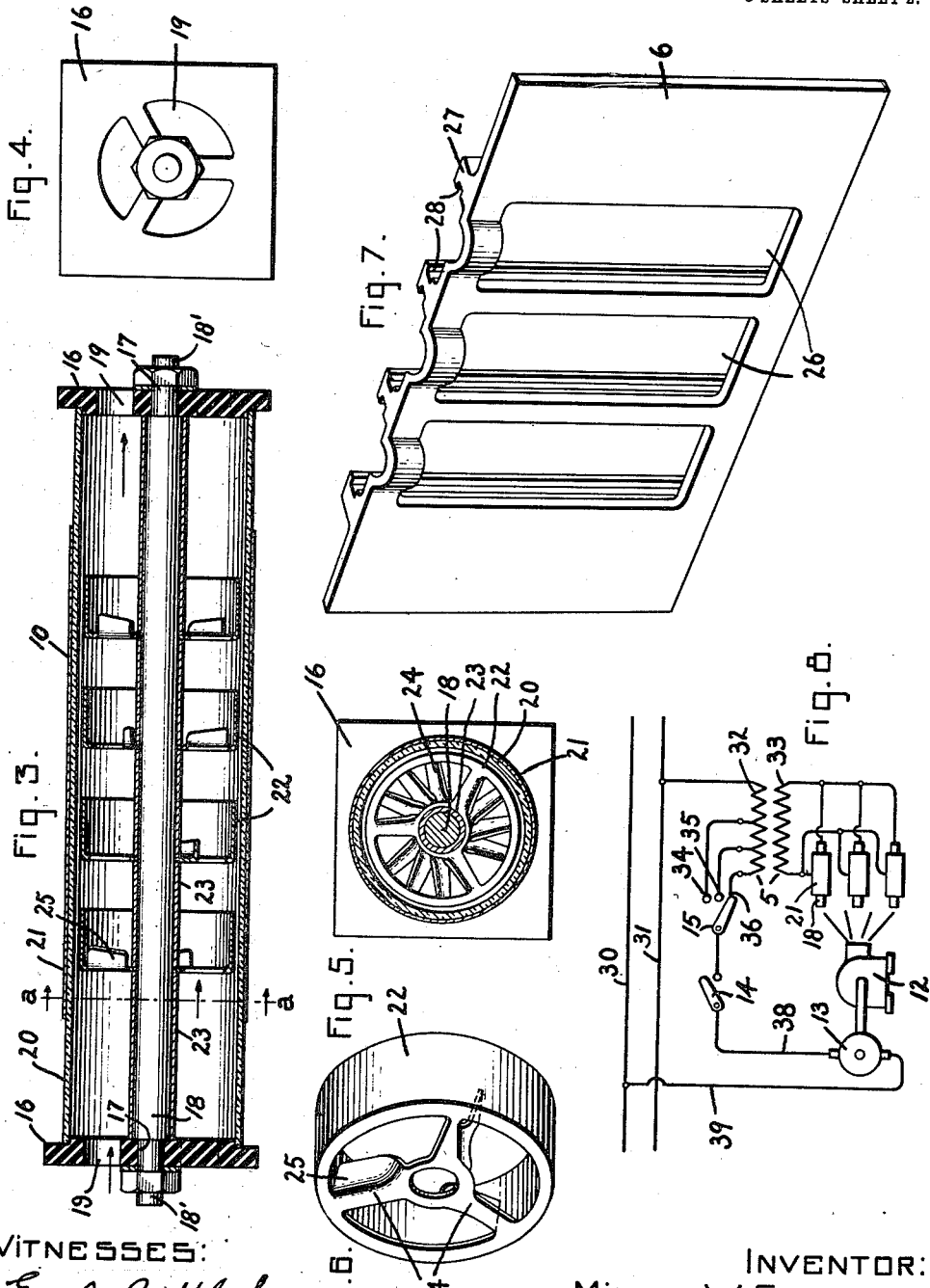

M. W. FRANKLIN.
METHOD AND APPARATUS FOR PRODUCING A GASEOUS REACTION BY A SILENT DISCHARGE.
APPLICATION FILED OCT. 21, 1911.
1,064,064.
Patented June 10, 1913.
3 SHEETS—SHEET 3.
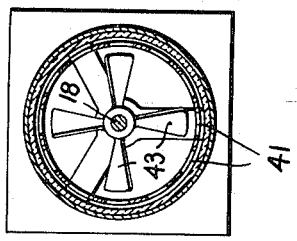
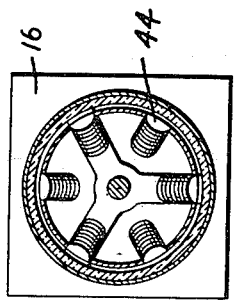
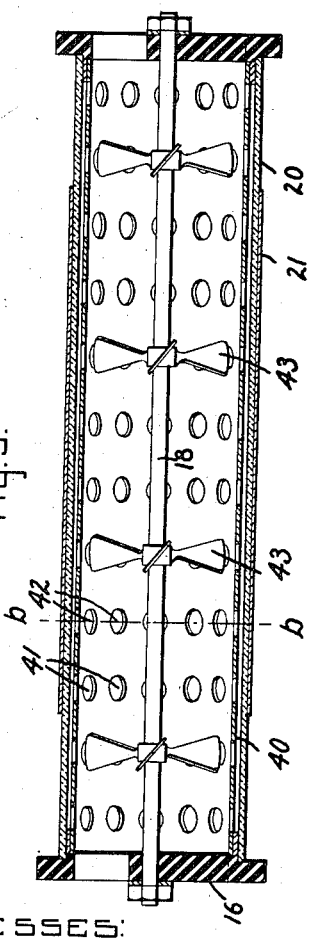
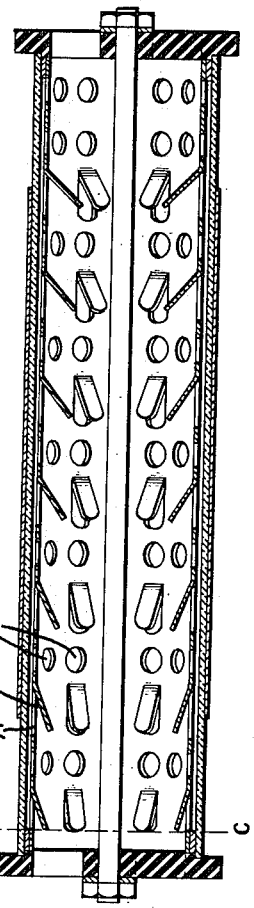
WITNESSES:
Earl G. Klock
J. Ellis Glen
INVENTOR:
MILTON W. FRANKLIN.
by Albert G. Davis
His Attorney.

UNITED STATES PATENT OFFICE.

MILTON W. FRANKLIN, OF SCHENECTADY, NEW YORK, ASSIGNOR TO GENERAL ELECTRIC COMPANY, A CORPORATION OF NEW YORK.

METHOD AND APPARATUS FOR PRODUCING A GASEOUS REACTION BY A SILENT DISCHARGE.

1,064,064. Specification of Letters Patent. Patented June 10, 1913.

Application filed October 21, 1911. Serial No. 656,003.

*To all whom it may concern:*

Be it known that I, MILTON W. FRANKLIN, a citizen of the United States, residing at Schenectady, county of Schenectady, State of New York, have invented certain new and useful Improvements in Methods and Apparatus for Producing a Gaseous Reaction by a Silent Discharge, of which the following is a specification.

My invention has reference to a method and apparatus for producing a gaseous reaction by a silent discharge, and more particularly to a method and apparatus for producing ozone.

It has hitherto been proposed to produce ozone by passing oxygen or air between electrodes between which there is maintained an electric stress and between which takes place a silent discharge. In devices of this character, however, which have hitherto been made, the gas to be ozonized was all passed between the two electrodes and the amount of ozonized air that could be produced by a given unit was limited to the amount that could thus be passed between the electrodes. Now I have found that during the process of forming ozone, as the ozone becomes more concentrated there is a tendency for the ozone to reform into oxygen. Moreover as the amount of available oxygen decreases, the ozonizing process becomes less effective. In an ordinary ozone machine, therefore, it has been found that ozone is formed less rapidly in that portion of the ozone unit through which the oxygen or air to be ozonized last passes than in the portion through which it first passes. I have found that with electrodes of a given size I can produce a much larger volume of ozonized air having a given degree of concentration by passing a current of fresh air through the ozone unit and mixing the fresh air with the ozonized air during successive stages of the ozonization and at the same time obtain an increase in efficiency.

Other novel features of my invention will be described in the specification and particularly pointed out in the claims.

For a fuller understanding of my invention, reference is had to the accompanying drawings, in which—

Figure 1 is an end elevation of my ozone machine, with the casing partially broken away to show the arrangement of the electrodes; Fig. 2 is a vertical section at right angles to Fig. 1; Fig. 3 is a longitudinal section of one of the ozone units; Fig. 4 is an end elevation of Fig. 3; Fig. 5 is a section taken on the line $a-a$ in Fig. 3; Fig. 6 is a perspective view of one of the sections of the inner electrode; Fig. 7 is a perspective view of the grid within which the ozone units are secured; Fig. 8 is a diagram of the electric connections; Fig. 9 is a modification of the ozone units shown in Fig. 3; Fig. 10 is a cross-section on the line $b-b$ of Fig. 9, and Figs. 11 and 12 are a longitudinal section and a cross-section on the line $c-c$ respectively of still another modification of the ozone unit.

Referring first to Figs. 1 and 2, 1 is a suitable casing within which are disposed the operating parts of the ozone machine. The casing is divided by a longitudinal partition 2 into an upper chamber 3 and a lower chamber 4, within which lower chamber is located a suitable transformer 5. The upper chamber 3 is again divided by a grid 6, into an anterior chamber 7 and a posterior chamber 8. The grid 6 is received in suitable slots 9 within the casing and holds in position the ozone units 10, as will hereinafter more fully appear. The casing immediately in front of the ozone units is provided with an opening in which is placed a suitable screen 11 through which the ozonized gas may pass. Circulation of the gases through the generator is produced by a blower 12 driven by a motor 13, the blower communicating with the chamber 3 through a passage 13'. The leading-in wires are connected to the device through a plug switch 14 and the device is also provided with a switch 15 by which the primary voltage of the transformer may be regulated.

In Figs. 3 and 4, an ozone unit 10 is shown in detail. Suitable insulating heads 16 are spaced apart by a rod 18, the contracted ends 18' of which are received within openings 17 in the insulating heads. The heads 16 are each provided with openings 19 through which the gas to be ozonized or the ozonized gas, as the case may be, may pass. The outer edges of the insulating heads are somewhat thinner than the remainder, forming annular collars about which the ends of a dielectric 20, preferably made of glass, is received. An electrode 21 immediately surrounds the dielectric 20 and may conveniently be formed by depositing copper thereon in any suitable manner. I have disclosed a method suitable for the deposition of a layer of copper on the outer surface of the dielectric in an application filed by me August 4, 1911, Serial Number 642,267. Upon the spacing rod 18 is suitably secured the inner electrode which is formed of a series of cylindrical sections 22 which are held in position on the rod by spacing sleeves 23. The outer surface of these sections has a diameter less than that of the interior of the dielectric, so that a space is formed between the outer surface of each section of the inner electrode and the inner surface of the dielectric. Each of such sections is provided at one end with a spider, each of the spokes 24 of which is provided with a flange 25 which is curved in two directions for a purpose which will hereinafter appear. Each section of the inner electrode may be conveniently stamped from a single piece of metal.

The front of the grid is provided with a series of vertically arranged lugs 27 having longitudinal grooves 28 within which the heads 16 are snugly received. The grid itself is provided with a series of openings 26 which are arranged opposite the ends of the ozone units 10 when the units are assembled in position. The ozone units are assembled as shown in Fig. 1 and may be spaced apart by spacing blocks 29, having the same width as the heads of the ozone units and provided with openings, if desired, to permit gas which is not acted upon to pass through the device without being ozonized in order to dilute the final gas. All of the gas which passes from the chamber 8 to the chamber 7 has to pass through the ozone units, with the exception of that which passes through the openings in the spacing blocks, in case such openings are provided. It will be noted that after the cover of the casing is removed, the grid together with all of the electrodes may be conveniently removed from the casing.

The electrical connections are shown in Fig. 8, in which 30 and 31 are the leading-in wires. The primary of the transformer 5 is indicated at 32 and the secondary at 33. One terminal of the secondary is connected in multiple to the outer electrodes, while the other terminal is similarly connected to the inner electrodes. One terminal of the primary 32 is connected to the leading-in wire 31. The other terminal is formed by any one of a series of terminals 34, 35 and 36 which the switch 15 is adapted to engage, so that the voltage of the transformer may be regulated in an obvious manner. The switch 15 is connected to the plug switch 14 which is in turn connected by a lead 38 to the motor 13. The other terminal of the motor is connected by a lead 39 to the leading-in wire 30.

The operation of my ozone generator is as follows: When the current is turned on by closing the plug switch, the motor starts the fan which forces air into the chamber 8 and then through the openings in the grid and through the ozone units into the chamber 7 from which the ozonized gas is discharged. At the same time an electrical stress is set up between the electrodes and a silent discharge takes place. In passing through a given ozone unit, a portion of the air first passes between the first section of the inner dielectric 20 where the air, or other gas, is subjected to a silent discharge between the two electrodes. The air which has not passed outside of the first section of the electrode passes through the same and is deflected outwardly and tangentially by the flanges 25 of the first section. The air thus deflected outwardly is mixed with the air which has been subjected to a silent discharge and in which has been produced a certain amount of ozone. The mixing of the fresh air with ozonized air is facilitated by the arrangement of the spokes of the successive spiders, a series of corresponding spokes being arranged in a spiral. Such an arrangement of the spiders, and hence of the flanges, tends of itself to produce a whirling movement of the gases passing through the units, and a mixing of the fresh air with that which has been ozonized. This process is repeated throughout the ozone unit. With the device constructed as described, it is obvious that the gas flows at a uniform rate through successive discharge passages formed between the sections 22 of the inner electrode and the dielectric 20.

It will readily be apparent that by successively mixing gas, which has not been subjected to the silent discharge, with the gas which has been modified by the silent discharge, I am enabled, with a device of a predetermined size, to produce a very much larger volume of ozonized gas having a given concentration than would be possible with another machine having the same size but in which the electrodes were formed of two simple cylinders through which all of the gas to be ozonized must pass. The gas thus ozonized passes from the units and from the machine either to the atmosphere or otherwise as is desired.

In Figs. 9 and 10, I have shown a modification of the structure which is shown in Figs. 3 and 4, in which the inner electrode is formed of sections which are entirely separated from one another. In the structure shown in Figs. 9 and 10, however, the inner electrode 40 is more or less continuous and is provided with two annular series of openings 41 and 42. A shaft 18 passes through the unit as in the structure shown in Fig. 3 and upon this shaft is mounted a series of blades 43 so disposed as to deflect the gas which passes through the unit outwardly through the openings 41 to the space between the inner electrode and the dielectric, where the gas is subjected to the silent discharge between the two electrodes. It will be noted that the pressure of the gas between the openings 41 and 42 is greater than the pressure within the inner electrode, and, when the mixture of ozone and air reaches the openings 42, a portion of the gas reënters the space within the inner electrode.

In Figs. 11 and 12 is shown still another modification, in which the inner electrode is provided with two series of openings 41 and 42 as in Fig. 9, but the air is deflected outwardly by a series of blades 44 which may be stamped down from the inner electrode itself.

While I have shown the best embodiment of my invention which is known to me and have particularly described the same in connection with the manufacture of ozone from the atmosphere, it is to be understood that my invention is not so limited, but would be equally applicable to the production of ozone from any suitable source, as for instance pure oxygen. Moreover, my invention is applicable wherever it is desirable to produce a chemical gaseous reaction by a silent discharge. Furthermore, while I have shown the electrodes cylindrical in form, it is to be understood that they may assume any shape desired so long as one of the electrodes is made in sections between which gas can pass from a passage provided adjacent that electrode and on the opposite side thereof from the coöperating electrode.

What I claim as new and desire to secure by Letters Patent of the United States, is,

1. The method of producing a gas having a different chemical composition from the initial gas which consists in causing the gas to flow at a substantially uniform rate through a series of discharge passages, subjecting the gas to a series of silent discharges and in mixing with the gas in its changed condition after each such discharge other gas having the same composition as the initial gas.

2. The method of producing ozone, which consists in causing air to flow at a substantially uniform rate through a series of discharge passages, subjecting the air to a series of silent discharges and in successively mixing air in its unchanged condition with the air thus treated between the successive silent discharges.

3. In an apparatus for producing a gaseous reaction by a silent discharge, a pair of electrodes between which a silent discharge is adapted to take place, one of said electrodes being made in sections and so arranged as to permit gas to pass between the successive sections, a gas passage disposed adjacent one of the electrodes on the opposite side thereof from its coöperating electrode, and means for successively deflecting the gas in said passage to the spaces between said coöperating electrode and the successive sections of the other electrode.

4. In an apparatus for producing a gaseous reaction by a silent discharge, an outer electrode and an inner electrode spaced therefrom and composed of a series of sections so arranged as to permit gas to pass throughout the electrode and between the successive sections, and means for successively deflecting the gas as it passes through said passage to the spaces between the one electrode and the successive sections of the other.

5. In an apparatus for producing a gaseous reaction by a silent discharge, a pair of concentric electrodes suitably spaced apart between which a silent discharge is adapted to take place, the inner electrode being composed of a series of sections arranged as to permit gas to pass throughout the electrode and between the successive sections, and means for successively deflecting the gas in said passage to the spaces between the outer electrode and the successive sections of the inner electrode.

6. In an apparatus for producing a gaseous reaction by a silent discharge, a pair of concentrically arranged electrodes suitably spaced apart between which a silent discharge is adapted to take place, a dielectric so disposed between the two electrodes as to leave a space between the dielectric and the inner electrode, the inner electrode being formed of a series of sections and so arranged as to permit passage of gas therethrough and between the successive sections, and means for deflecting the air outwardly and tangentially between the outer electrode and the successive sections of the inner electrode.

7. In an apparatus for producing a gaseous reaction by a silent discharge, an outer cylindrical electrode and an inner electrode composed of a series of cylinders concentric with the outer electrode and suitably spaced therefrom, a spider so disposed within each cylinder of the inner electrode as to deflect the air outwardly between the outer electrode and the successive cylinders composing the inner electrode.

8. In an apparatus for producing a gaseous reaction by a silent discharge, an outer cylindrical electrode and an inner electrode composed of a series of cylinders concentric with the outer electrode and suitably spaced therefrom, each cylinder being provided with a spider having flanges so formed as to deflect the air outwardly and tangentially between the outer electrode and the successive cylinders, the corresponding spokes of the successive spiders being spirally arranged.

In witness whereof, I have hereunto set my hand this 19th day of October, 1911.

MILTON W. FRANKLIN.

Witnesses:
BENJAMIN B. HULL,
HELEN ORFORD.